_United States Patent_ [19]

Sugasawa et al.

[11] 4,391,240
[45] Jul. 5, 1983

[54] INTERNAL COMBUSTION ENGINE

[75] Inventors: Fukashi Sugasawa, Yokohama; Haruhiko Iizuka, Yokosuka, both of Japan

[73] Assignee: Nissan Motor Company, Limited, Yokohama, Japan

[21] Appl. No.: 134,314

[22] Filed: Mar. 26, 1980

[30] Foreign Application Priority Data

Mar. 27, 1979 [JP] Japan .................................. 54-35015

[51] Int. Cl.³ ............................................. F02D 17/03
[52] U.S. Cl. .................. 123/198 F; 123/481; 123/568; 123/571
[58] Field of Search ............... 123/198 F, 481, 568

[56] References Cited

U.S. PATENT DOCUMENTS

| | | |
|---|---|---|
| 3,958,900 | 5/1976 | Ueno . |
| 4,257,372 | 3/1981 | Etoh .................. 123/198 F |
| 4,274,373 | 6/1981 | Sugasawa ............ 123/198 F |
| 4,276,863 | 7/1981 | Sugasawa ............ 123/198 F |
| 4,292,938 | 10/1981 | Tanaka ............... 123/198 F |

FOREIGN PATENT DOCUMENTS 2659518 7/1977 Fed. Rep. of Germany .

OTHER PUBLICATIONS

"Mot Technik", Published Feb., 1979, pp. 36–38.

_Primary Examiner_—Ronald B. Cox
_Attorney, Agent, or Firm_—Schwartz, Jeffery, Schwaab, Mack, Blumenthal & Koch

[57] ABSTRACT

An internal combustion engine is disclosed which includes an active cylinder unit always active and an inactive cylinder unit being inactive when the engine load is below a predetermined value. The engine has an intake passage divided into first and second branches leading to the active and inactive cylinder units, respectively. The second intake passage branch is connected through an EGR passage to the exhaust passage of the engine. The second intake passage branch has therein a stop valve and the EGR passage having therein an EGR valve. Means are provided for closing the stop valve and opening the EGR valve at a predetermined time after a low engine load condition occurs.

26 Claims, 9 Drawing Figures

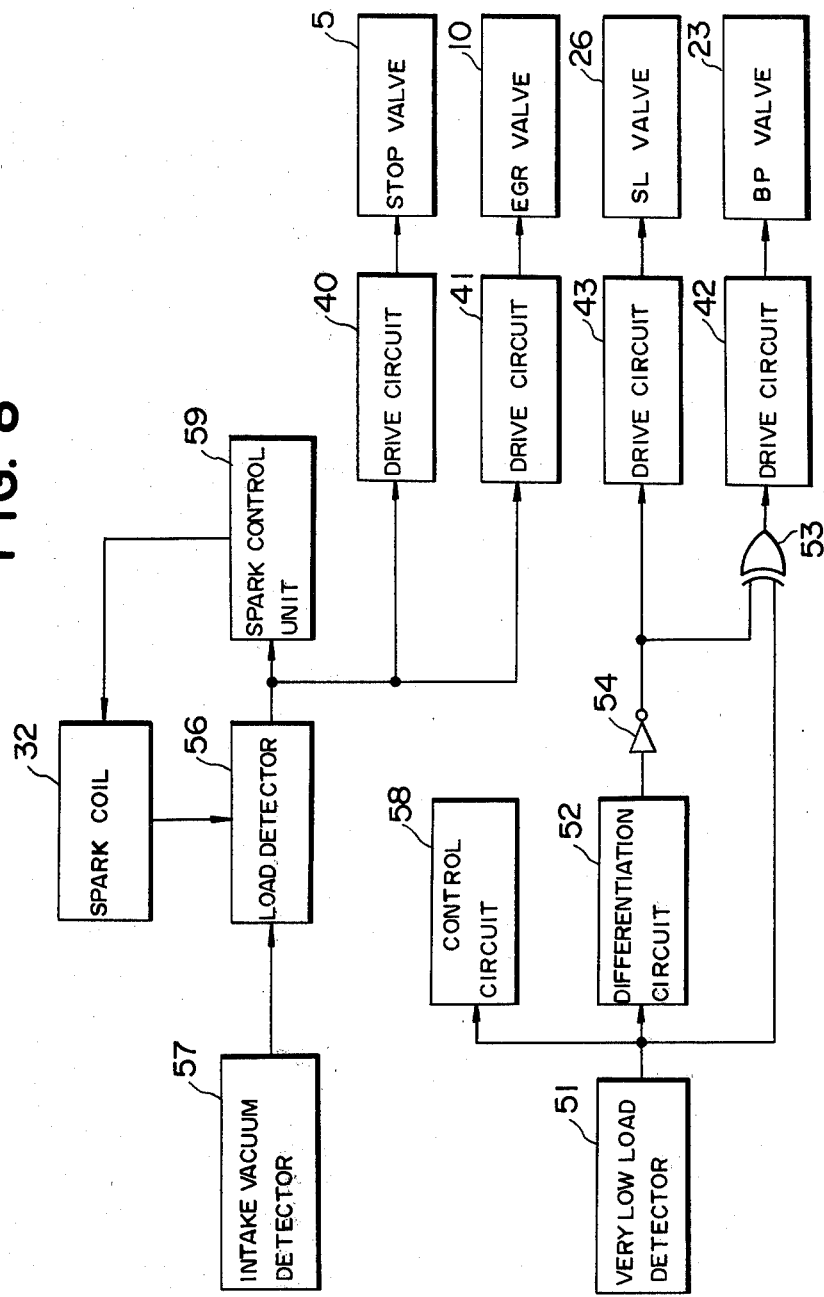

ent invention, such attempts have been found to be insufficient.

INTERNAL COMBUSTION ENGINE

BACKGROUND OF THE INVENTION

1. Field of the Invention

The present invention relates to an internal combustion engine of the split type having a plurality of cylinders split into first and second groups, the first group of cylinders being always active and the second group of cylinders being inactive when the engine load is below a given value.

2. Description of the Prior Art

It is generally known that internal combustion engines demonstrate better fuel combustion and thus higher fuel economy when running under higher load conditions. In view of this, split type internal combustion engines have already been proposed as automotive vehicle engines or the like which are subject to frequent engine load variations. Such split type internal combustion engines include a group of cylinders which are always active and a group of cylinders which are inactive when the engine load is below a given value. The intake passage is divided into first and second branches, the first branch being associated with the active cylinders and the second branch being associated with the inactive cylinders. A stop valve is provided in the second branch and adapted, in its closed position, to cut off the flow of air to the inactive cylinders so that the engine operates only on the active cylinders at low load conditions. This increases the load on the active cylinders resulting in higher fuel economy.

An exhaust gas recirculation system has been incorporated in such a split engine for re-introduction of a significant amount of exhaust gases into the inactive cylinders in order to minimize inactive cylinder pumping losses during a split engine operation. It has been found, however, that exhaust gases escape through the stop valve from the first intake passage branch into the second intake passage branch, resulting in unstable active cylinder operation during split engine operation, especially where a pressure differential exists across the stop valve. Attempts have been made to eliminate the possibility of exhaust gas leakage, but, prior to the present invention, such attempts have been found to be insufficient.

SUMMARY OF THE INVENTION

It is therefore one object of the present invention to eliminate the above described disadvantages existing in prior art split cylinder type engines.

Another object of the present invention is to provide an improved split type internal combustion engine which is stable in operation particularly during a split engine operation.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The present invention will be described in greater detail by reference to the following description taken in connection with the accompanying drawings, in which:

FIG. 8 is a block diagram showing electronic control system used in the engine of FIG. 7.

DESCRIPTION OF THE PREFERRED EMBODIMENTS

Figure 1:
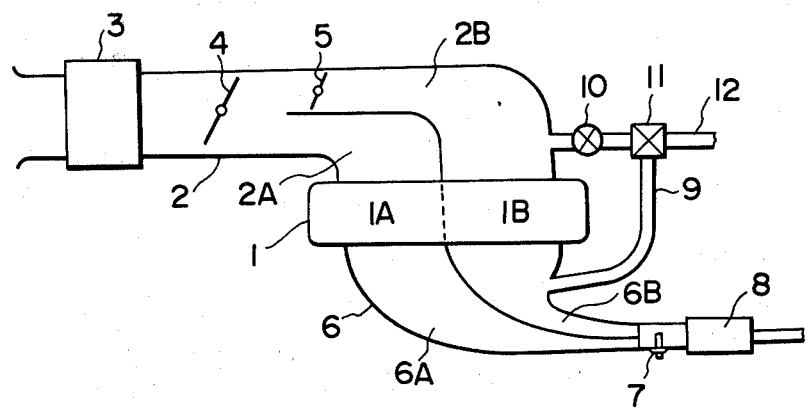
FIG. 1 is a schematic view showing a conventional split type internal combustion engine.

Prior to the description of the preferred embodiments of the present invention, we shall briefly describe the prior art split type internal combustion engine in FIG. 1 in order to specifically point out the difficulties attendant thereon.

Referring to FIG. 1, the reference numeral 1 designates an engine block containing therein an active cylinder unit 1A having at least one cylinder being always "active" and an inactive cylinder unit 1B having at least one cylinder being "inactive" when the engine load is below a predetermined value.

Air is supplied to the engine through an intake passage 2 having therein an air cleaner 3 and a throttle valve 4 located downstream of the air cleaner 3. The throttle valve 4 is drivingly connected to the accelerator pedal (not shown) for controlling the flow of air to the engine. The intake passage 2 is divided downstream of the throttle valve 4 into first and second branches 2A and 2B. The first branch 2A leads to the active cylinder unit 1A and the second branch 2B leads to the inactive cylinder unit 1B. The second intake passage branch 2B has therein a stop valve 5 adapted to close the second branch 2B so as to cut off the flow of air to the inactive cylinder unit 1B during a split engine operation.

The engine also has an exhaust passage 6 divided by a partition into first and second branches 6A and 6B, the first branch 6A leading from the active cylinder unit 1A and the second branch 6B leading from the inactive cylinder unit 1B. The exhaust passage 6 has therein an oxygen sensor 7 located at a position near the downstream end of the partition. The oxygen sensor 7 monitors the oxygen content of the exhaust to provide a signal indicative of the air/fuel ratio at which the engine is operating. The exhaust passage 6 also has therein a three-way catalytic converter 8 located at a position downstream of the oxygen sensor 7. The catalytic converter 8 effects oxidation of HC and CO and reduction of NOx so as to minimize the emission of pollutants through the exhaust passage.

An exhaust gas recirculation (EGR) passage 9 is provided which has one end opening into the second exhaust passage branch 6B and the other end opening into the second intake passage branch 2B. The EGR passage 9 has therein an EGR valve 10 adapted to open so as to allow recirculation of exhaust gases from the second exhaust passage branch 6B into the second intake passage branch 2B thereby minimizing inactive cylinder pumping losses during a split engine operation.

It has been found in such a conventional split engine that a part of the exhaust gases charged in the second intake passage branch 2B escapes through the stop valve 5 into the first intake passage branch 2A which adversely affects the stability of operation of the inactive cylinder unit 1A during a split engine operation. This is true particularly at very low load conditions such as idle conditions, where a large pressure differential exists across the stop valve 5 between the first and second intake passage branches 2A and 2B.

In order to avoid such exhaust gas leakage, a three-way solenoid valve 11 has been provided which has an outlet connected through the EGR valve 10 to the second intake passage branch 2B, a first inlet connected to the second exhaust passage branch 6B, and a second inlet connected to an air passage 12. The solenoid valve 11 is adapted to provide communication between its outlet and its first inlet for introducing exhaust gases into the second intake passage branch 2B during a normal split engine operation, and for providing communication between its outlet and its second inlet for introducing air into the second intake passage branch 2B at very low load conditions.

With such an arrangement, however, cold air is discharged from the inactive cylinder unit 1A into the second exhaust passage branch 6B which reduces the temperature of the exhaust gases flowing through the catalytic converter 8 so as to adversely affect its performance. In order to prevent such exhaust gas temperature reduction, a complex means is required to control the operation of the solenoid valve 11.

Figure 2:
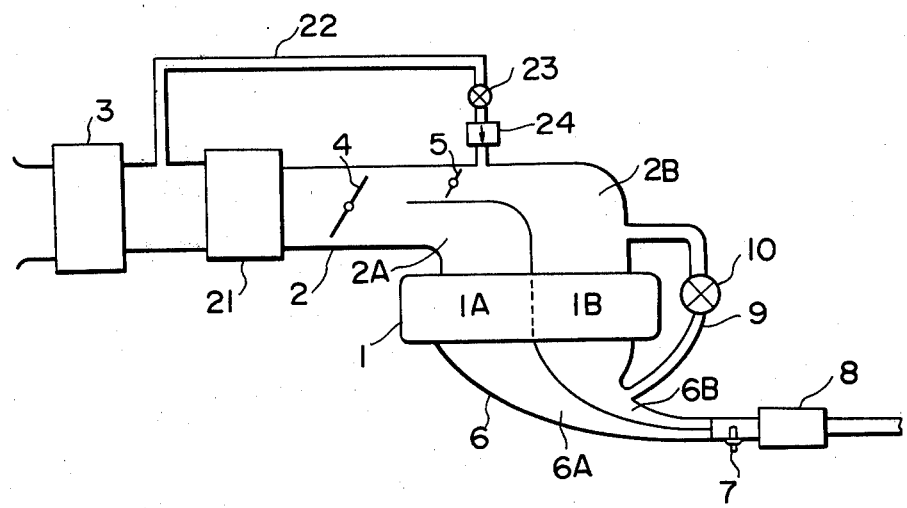
FIG. 2 is a schematic view showing one embodiment of a split type internal combustion engine constructed in accordance with the present invention.

Referring to FIG. 2, there is illustrated one embodiment of a split engine made in accordance with the present invention. Parts in FIG. 2 which are like those in FIG. 1 have been given the same reference character and will not be described further. Although the present invention will be described in connection with a 6-cylinder split engine with an ative cylinder unit 1A including three cylinders and an inactive cylinder unit 1B including three cylinders for convenience of disclosure, it is to be noted that this invention may be readily applied to any split engine structure regardless of the number of cylinders. An air flow meter 21 is provided in the intake passage 2 between the air cleaner 3 and the throttle valve 4 for measuring the air flow rate in the intake passage 2. A bypass passage 22 is provided which has one end opening into the intake passage 2 between the air cleaner 3 and the air flow meter 21 and the other end opening into the second intake passage branch 2B at a point downstream of the stop valve 5. The bypass passage has therein an air valve 23 and a check valve 24. In this embodiment, the three-way solenoid valve 11 is removed.

Figure 3:
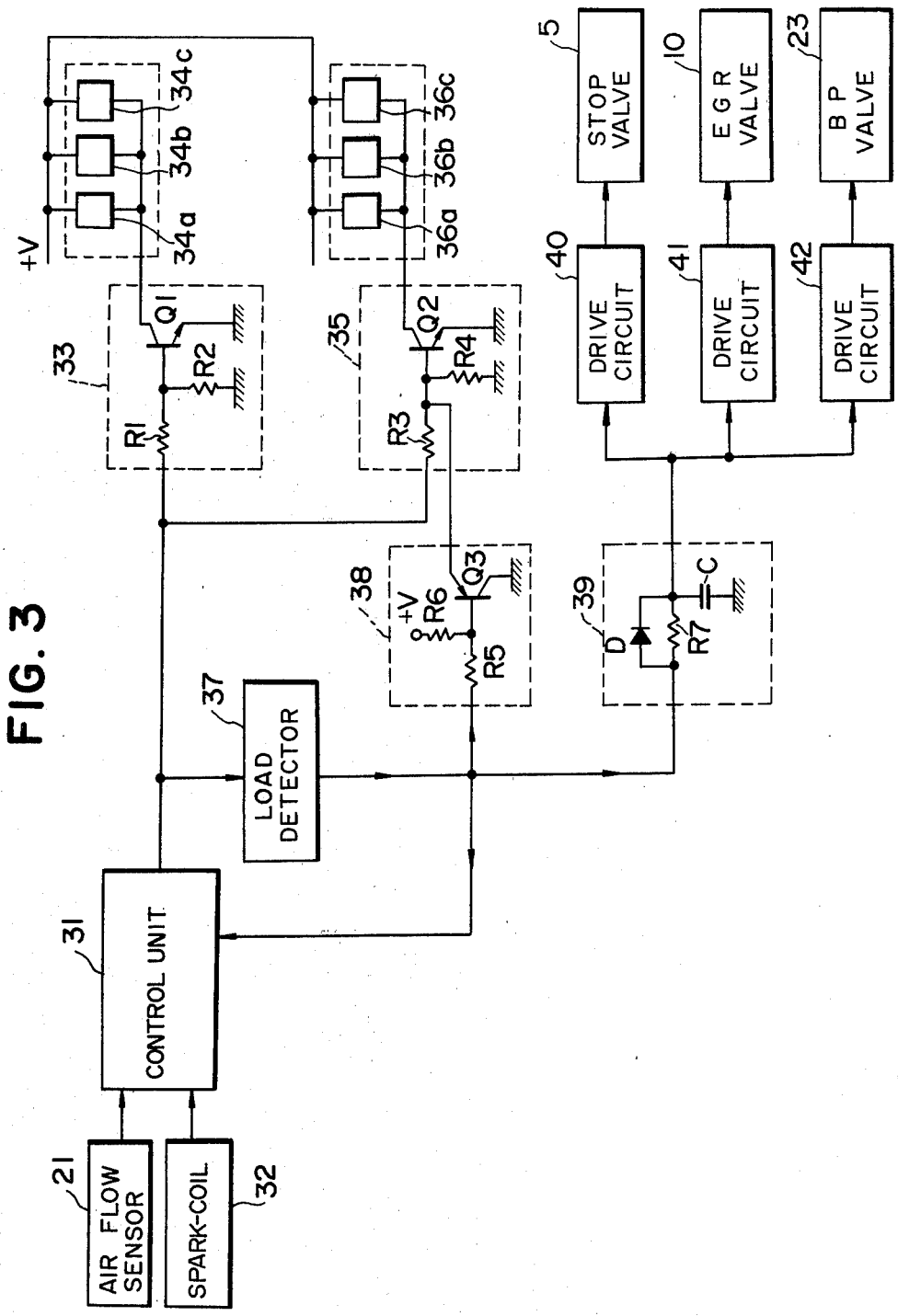
FIG. 3 is a block diagram showing the electronic control system used in the engine of FIG. 2.

Referring to FIG. 3, there is illustrated an electronic control system for controlling the opening and closing of the valves 5, 10 and 23 of FIG. 2. The control system includes a control unit 31 to which is inputted a signal indicative of air flow rate as determined by the air flow meter 21 and also a signal indicative of engine rotational speed determined from a spark coil 32 for generating at its output a fuel injection pulse signal of pulse width determined by the engine load. It is to be noted, of course, that the control unit 31 may have additional inputs from switch means such as an ignition switch and from sensors adapted to monitor various engine operating conditions such as crank angle, intake air temperature, engine coolant temperature, fuel density, and exhaust gas temperature.

The output of the control unit 31 is applied to a first drive circuit 33 for operating a first group of fuel injection valves 34a to 34c and also to a second drive circuit 35 for operating a second group of fuel injection valves 36a to 36c. The first group of fuel injection valves 34a to 34c supply fuel to the respective cylinders in the active cylinder unit 1A and the second group of fuel injection valves 36a to 36c supply fuel to the respective cylinders in the inactive cylinder unit 1B. The first drive circuit 33 may comprise a NPN transistor Q1 having its base connected through a resistor R1 to the output of the control unit 31 and also through a resistor R2 to ground. The emitter of the transistor Q1 is grounded and the collector thereof is connected to the fuel injection valves 34a to 34c. The second drive circuit 35 is substantially similar in structure to the first drive circuit 33 and may comprise a NPN transistor Q2, the base of which is connected through a resistor R3 to the output of the control unit 31 and also through a resistor R4 to ground. The emitter of he transistor Q2 is grounded and the collector thereof is connected to the fuel injection valves 36a to 36c.

The output of the control unit 31 is also applied to a load detector 37 which detects engine load in accordance with the pulse width of the fuel injection pulse signal applied thereto. The load detector 37 provides a low output at low load conditions and provides a high output when the engine load exceeds a predetermined value.

The control unit 31 determines the pulse width t of the fuel injection pulse signal from the relationship $t = K \cdot (Q/N)$ where Q is the air flow rate measured by the air flow meter 21, N is the engine rotational speed measured in accordance with the spark pulses from the spark coil 32, and K is a constant. The amount of air introduced into each cylinder in the inactive cylinder unit 1A during a split engine operation is double that introduced during full engine operation. Accordingly, the constant K should be halved during a split engine operation. For this purpose, the control unit 31 is designed to reduce the constant K to half when receiving a low input from the load detector 37.

In addition, the control unit 31 is designed to interrupt feedback or λ-control if an oxygen sensor is used to control the amount of fuel supplied to the engine so as to maintain a desired optimum air/fuel ratio. The reason for this is that during a split engine operation, the air discharged from the inactive cylinder unit 1B is mixed with the exhaust gases discharged from the active cylinder unit 1A and the resulting mixture flows over the oxygen sensor 7, so that the oxygen sensor 7 provides a feedback control signal to enrich the air/fuel ratio. It is preferable to retard the interruption of the λ-control for a time period corresponding to the amount of time it takes for the air discharged from the inactive cylinder unit 1B to reach the oxygen sensor 7.

The output of the load detector 37 is also applied to a fuel-cut control circuit 38 which is responsive to a low input therefrom to provide a fuel-cut signal to the second drive circuit 35 so as to cause the second drive circuit 35 to cut off the supply of the fuel injection signal to the fuel injection valves 36a to 36c. The fuel-cut control circuit 38 may comprise a PNP transistor Q3 having its base connected through a resistor R5 to the output of the load detector 37 and also through a resistor R6 to a DC voltage source. The emitter of transistor Q3 is connected to the base of transistor Q2 in the second drive circuit 35.

The output of the load detector circuit 37 is also applied to a timer circuit 39. The timer circuit 39 has its output changed from a high level to a low level with a delay time T after the output of the load detector 37 changes from its high level to its low level. The timer circuit 39 output changes back from its low level to its high level immediately after the output of the load detector 37 changes from its low level to its high level. The timer circuit 39 may comprise an integrating circuit made up of a resistor R7 and a capacitor C, and a diode D connected in parallel with the resistor R7. The timer circuit 39 thus provides a low signal indicative of low engine load conditions a predetermined time T after receiving a low load signal from the load detector 37.

The output of the timer circuit 39 is applied to a stop valve drive circuit 40, an EGR valve drive circuit 41, and an bypass (BP) valve driver circuit 42. The stop valve drive circuit 40 is responsive to a low input to close the stop valve 5 and the EGR valve drive circuit 41 is responsive to a low input to open the EGR valve 10. The BP valve drive circuit 42 is responsive to a low input to open the bypass valve 23.

Figure 4:
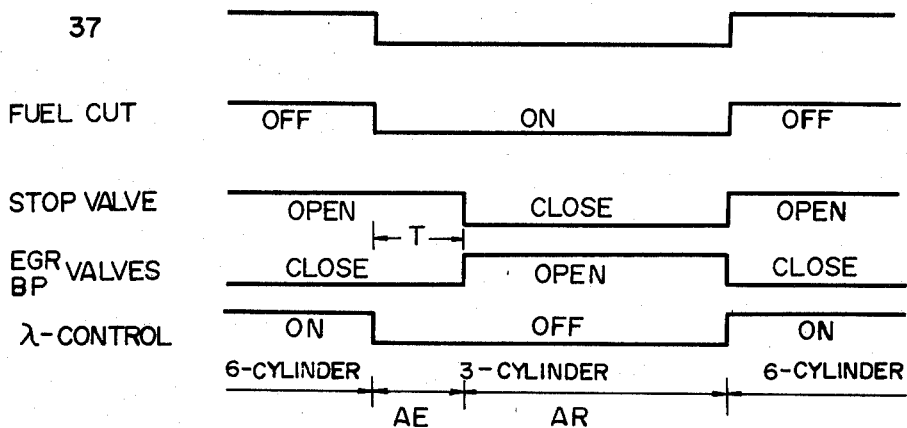
FIG. 4 is a time chart useful for explaining the operation of the electronic control system of FIG. 3.

Referring to FIG. 4, the operation of the electronic control system of FIG. 3 will be described in connection with the waveform of the output of the load detector 37.

Assuming first that the engine load is above a predetermined value and the engine is in a 6-cylinder mode of operation, the load detector 37 provides a high output, as shown by the waveform 37 of FIG. 4, so that the stop valve 5 is open to allow the flow of air through the second intake passage branch 2B into the inactive cylinder unit 1B, the EGR valve 10 is closed to interrupt exhaust gas recirculation, and the bypass valve 23 is closed to cut off the flow of air through the bypass passage 22 to the second intake passage branch 2B.

If the engine load falls below the predetermined value, the output of the load detector 37 changes from its high level to its low level, as shown by the waveform of FIG. 4. As a result, the fuel-cut control circuit 38 causes the second drive circuit 35 to cut off the supply of fuel injection pulses to the fuel injection valves 36a to 36c so as to cut off the supply of fuel for the second cylinder unit 1B. The timer circuit 39 operates to suspend activation of the drive circuits 40 to 42 and thus the operation of valves 5, 10 and 23 for the predetermined time T during which no exhaust gas recirculation is effected and air is discharged from the inactive cylinder unit 1B. In this state of the system, the control unit 31 is responsive to a low input from the load detector 37 to double the constant K and interrupt the feedback or λ-control.

The output of the timer circuit 39 changes from its high level to its low level a predetermined time T after the output of the load detector 37 changes to the low level. As a result, the stop valve drive circuit 40 causes the stop valve 5 to close so as to cut off the flow of air through the second intake passage branch 2B, causes the EGR valve drive circuit 41 to open the EGR valves 10 so as to allow recirculation of the air which has been discharged from the inactive cylinder unit 1B into the second intake passage branch 2B, and causes the BP valve drive circuit 42 to open the bypass valve 23 so as to compensate for the amount of air escaping through the stop valve 5 into the first intake passage branch 2A. The check valve 24 is for preventing the counterflow of the gases charged in the second intake passage branch 2B into the intake passage 2 due to exhaust pulsations. Since only air escapes through the stop valve 5 into the first intake passage branch 2A, the active cylinder unit 1A is held stable in operation.

If the engine load increases again above the predetermined value, the output of the load detector 37 changes from its low level to its high level. This changes the output of the fuel-cut control circuit 38 to the high level so as to cause the second drive circuit 35 to resume the application of fuel injection pulses to the fuel injection valves 36a to 36c, and also to change the output of the timer circuit 39 to the high level so as to cause the stop valve drive circuit 40 to open the stop valve 5, the EGR valve drive circuit 41 to close the EGR valve 10, and the BP valve drive circuit 42 to close the bypass valve 23, whereby the engine is placed in a 6-cylinder mode of operation. In addition, the control unit 31 is responsive to the high output of the load detector 37 to return the constant K to its initial value and also to resume λ-control.

This embodiment requires an interruption of the λ-control during a split engine operation since air is charged into the second intake passage branch 2B at low load conditions. It is preferable, in view of catalytic converter performance, to reduce the period of interruption of the λ-control.

Figure 5:
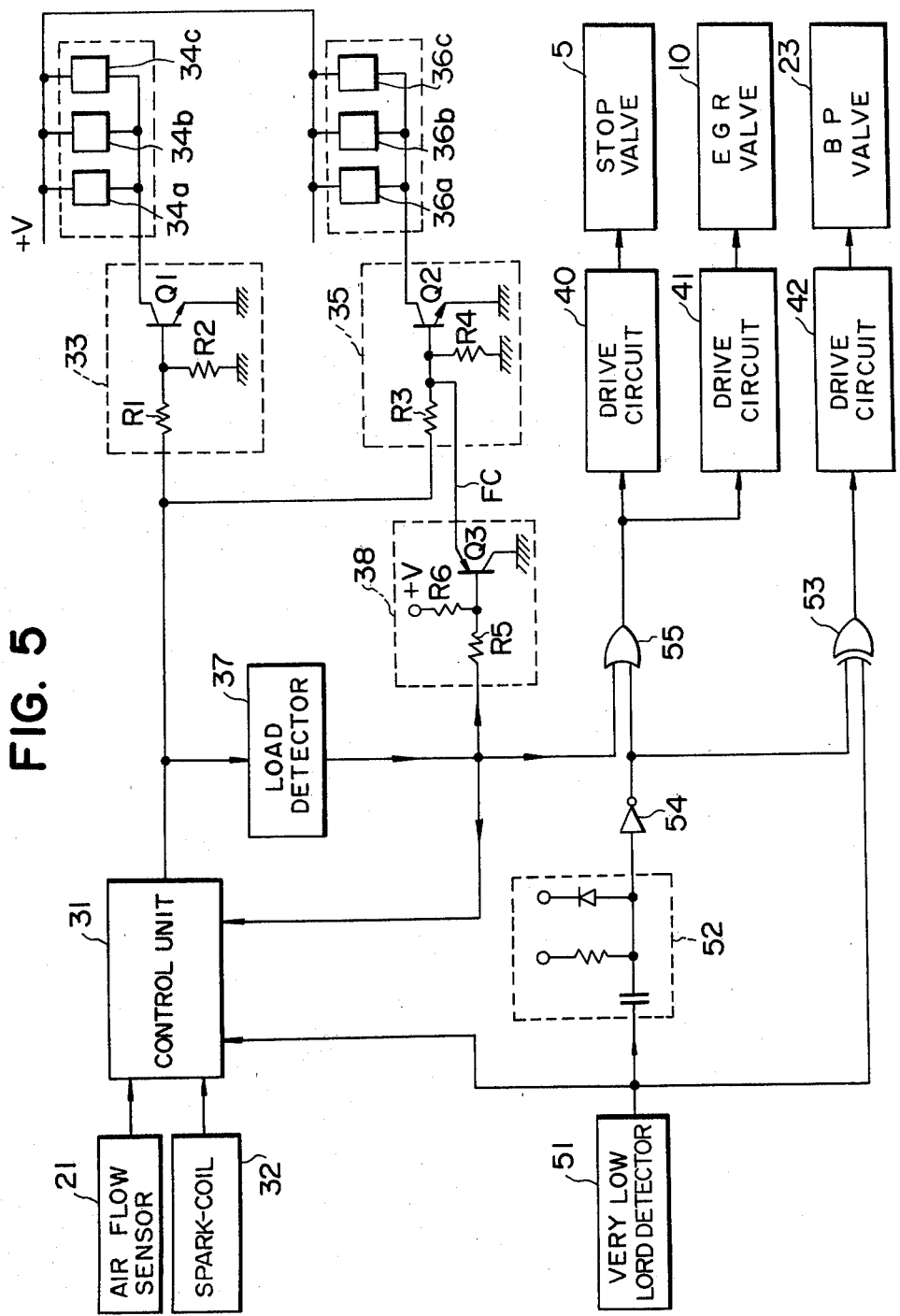
FIG. 5 is a block diagram showing a modification of the electronic control system.

Referring to FIG. 5, there is illustrated a modification of the electronic control system in which air is introduced into the second intake passage branch 2B only at very low load conditions where a great pressure differential exists across the stop valve 5. Like reference numerals have been applied to FIG. 5 with respect to the equivalent components shown in FIG. 3.

A very low load detector 51 is provided which may be designed to detect the fully closed position of the throttle valve 4 (FIG. 2) to provide a low output indicative of very low load conditions. The output of the very low load detector 51 is applied to the control unit 31 which interrupts λ-control in response to a low output from the very low load detector 51. The output of the very low load detector 51 is coupled to a differentiation circuit 52 and also to one input of an exclusive-or gate 53. The differentiation circuit 52 has its output changed from its high level to its low level at the same time as the output of the very low load detector 51 changes from its high level to its low level and returns to the low level a predetermined time later or when the output of the very low load detector 51 changes from the low level to the high level. The output of the differentiation circuit 52 is coupled to an inverter 54. The output of the inverter 54 is connected to the other input of the exclusive-or gate 53 and also to one input of an OR gate 55, the other end of which is connected to the load detector 37. The output of the exclusive-or gate 53 is connected to the BP valve drive circuit 42 and the output of the OR gate 55 is connected to the stop valve drive circuit 40 and also to the EGR valve drive circuit 41.

Figure 6:
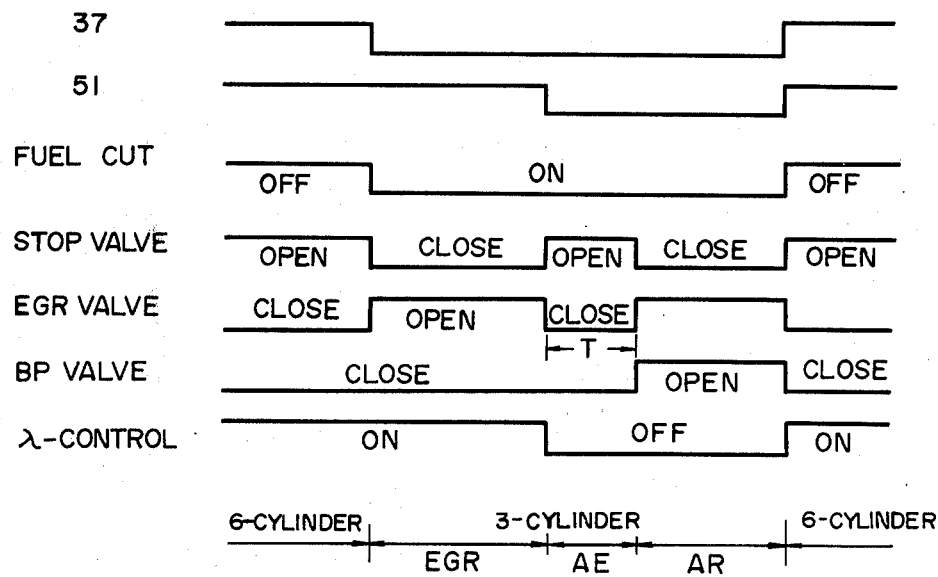
FIG. 6 is a time chart useful for explaining the operation of the control system of FIG. 5.

Referring to FIG. 6, the operation of the electronic control system of FIG. 5 will be described in connection with the waveforms of the outputs of the load detector 37 and the very low load detector 51.

At high load conditions, both of the outputs of the load detector 37 and the very low load detector 51 are high as shown by the waveforms 37 and 51 of FIG. 6. Consequently, the OR gate 55 provides a high output to cause the drive circuit 40 to open the stop valve 5 so as to allow the flow of air through the second intake passage branch 2B into the inactive cylinder unit 1A and energizes the drive circuit 41 to close the EGR valve 10. Also, during high-load conditions, the exclusive-or gate 53 provides a high output to cause the drive circuit 42 to close the BP valve 23 so that the engine is placed in a 6-cylinder mode of operation. In this state of the system, the control unit 31 is responsive to the high output of the very low load detector 51 to perform λ-control.

If the engine load falls below a predetermined value but above a very low value, the output of the load detector 37 changes to its low level while the output of the very low load detector 51 remains high. As a result, the output of the OR gate 55 changes to the low level to cause the drive circuit 40 to close the stop valve 5 so as to cut off the flow of air to the inactive cylinder unit 1B and to cause the drive circuit 41 to open the EGR valve 10 so as to allow recirculation of exhaust gases into the second intake passage branch 2B. The output of the exclusive-or gate 53 is held high so that the bypass passage 23 is held closed. In addition, the fuel cut-off circuit 38 is responsive to the low output of the load detector 37 to cause the second drive circuit 35 to deenergize the fuel injection valves 36a to 36c so as to cut off the supply of fuel to the inactive cylinder unit 1B. Consequently, the engine is placed in a 3-cylinder mode of operation. In this state of the system, the control unit 31 is responsive to the high output of the very low load detector 51 to continues λ-control and is responsive to the low output of the load detector 37 to double the constant K.

When the engine load falls to the very low value, the output of the very low load detector 51 changes to its low level and the output of the load detector 37 is held low as shown by the waveforms 37 and 51 of FIG. 6. In this state of the system, the fuel cut-off circuit 38 continuously interrupts the operation of the fuel injection valves 36a to 36c so that the inactive cylinder unit 1B is supplied with no fuel. The control unit 31 is responsive to the low output of the load detector circuit 37 to double the constant K and is responsive to the low output of the very low load detector 51 to interrupt λ-control. In this state of the system, the output of the inverter 54 changes to a high level only for a predetermined time T and thereafter returns to a low level. Accordingly, for the time T after the occurrence of a very low load condition, the OR gate 55 has a high input from the inverter 54 and a low input from the load detector 37. It therefore provides a high output so as to open the stop valve 5 and close the EGR valve 10. At the same time the exclusive-or gate 53 has a low input from the load detector 37 and a high input from the inverter 54 and therefore provides a high output so as to close the air valve 23. As a result, air is introduced through the second intake passage branch 2B into the inactive cylinder unit 1B and is discharged into the second exhaust passage branch 6B without recirculation.

After the predetermined time T lapses, the output of the differentiation circuit 52 changes to its high level so as to change the output of the inverter 54 to a low level. In this state of the system, the OR gate 55 has a low input from the inverter 54 and a low input from the load detector 37 and provides a low output, causing the drive circuit 40 to close the stop valve 5 so as to cut off the flow of air through the second intake passage branch 2B into the inactive cylinder unit 1B and energizes the drive circuit 41 to open the EGR valve 10 so as to allow recirculation of air through the EGR passage 9 into the second intake passage branch 2B. The exclusive-or gate 53 has a low input from the inverter 54 and a low input from the very low load detector 51 and therefore provides a low output, causing the drive circuit 42 to open the bypass valve 23 so as to allow the flow of air through the bypass passage 22 to compensate for the amount of air consumed. The control circuit 31 continues to interrupt λ-control and to double the constant K.

If the engine load increases again above the predetermined value, the output of the load detector 37 changes to its high level and the output of the very low load detector 51 changes to its high level as shown by the waveforms 37 and 51 of FIG. 6. In this state of the system, the fuel-cut circuit 38 allows the second drive circuit 35 to resume the application of fuel injection pulses to the fuel injection valves 36a to 36c. The control unit 31 is responsive to the high output of the load detector circuit 37 to resume λ-control and return the constant K to its initial value. The output of the OR gate 55 changes to a high level to cause the drive circuit 40 to open the stop valve 5 to allow the flow of air through the second intake passage branch 2B into the inactive cylinder unit 1B and the drive circuit 41 to close the EGR valve 10 so as to stop air recirculation into the second intake passage branch 2B. The output of the exclusive-or gate 53 changes to a high level, causing the drive circuit 42 to close the air valve 23. As a result, the engine is returned to a 6-cylinder mode of operation.

Figure 7:
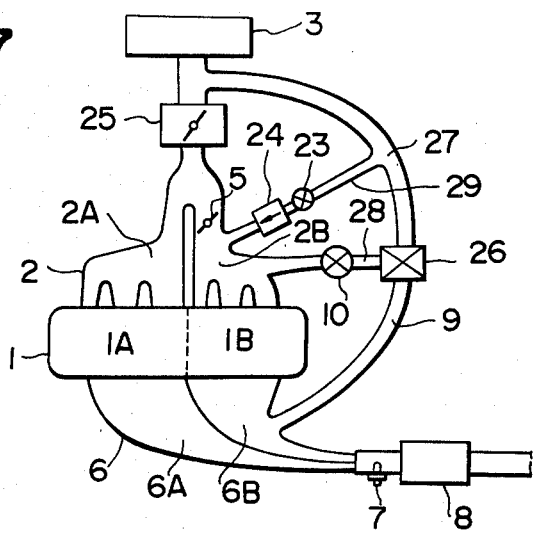
FIG. 7 is a schematic view showing an alternative embodiment of the present invention.

Referring now to FIG. 7, there is illustrated an alternative embodiment of the invention as applied to a carburetor type split engine. Parts in FIG. 7 which are similar to those in FIG. 2 have been given the same reference character and will not be described further. In FIG. 7, the reference numeral 25 designates a carburetor and the numeral 26 a three-way solenoid valve. The solenoid valve 26 is connected to the EGR valve 10 and thereby to the second intake passage branch 2B. Through outlet passage 28 the valve 26 is connected through the EGR passage 9 to the second exhaust passage branch 6B. A second inlet of the valve 26 is connected through a passage 27 to the intake passage 2 at a position between the air cleaner 3 and the carburetor 25. A bypass passage 29 is provided which connects the second intake passage branch 2B to the intake passage 2 at a position between the air cleaner 3 and the carburetor 25.

Referring to FIG. 8, there is illustrated an electronic control system for controlling the opening and closing of the valves 5, 10 and 23 of FIG. 7. Like reference numerals have been applied to FIG. 8 with respect to the equivalent components shown in FIG. 5. The control system comprises a load detector 56 which may be of the type responsive to the output of a spark coil 32, indicative of the rate of rotation of the engine, and also to the output of an intake manifold vacuum detector 57, indicative of the engine load for providing a low output at low load conditions and a high output when the engine load exceeds a predetermined value. The output of the load detector 56 is coupled to the drive circuits 40 and 41 and also to a spark timing control circuit 59. The control circuit 59 is responsive to a high input from the load detector 56 to supply spark pulses to all of the spark plugs of the active and inactive cylinder units 1A and 1B and is responsive to a low input to interrupt the supply of spark pulses to the spark plugs of the inactive cylinder unit 1B. The output of the very low load detector 51 is coupled through the differentiation circuit 52 to the inverter 54 and also to one input of the exclusive-or gate 53. The output of the inverter 54 is connected to the other input of the exclusive-or gate 53 and also to solenoid (SL) valve drive circuit 43 for controlling the operation of the solenoid valve 26. The SL valve drive circuit 43 is responsive to a low input from the inverter 54 to provide communication between its outlet and its first inlet and responsive to a high input therefrom to establish communication between its outlet and its second inlet. The output of the exclusive-or gate 53 is connected to the bypass (BP) valve drive circuit 42. The output of the very low load detector 51 is also connected to a $\lambda$-control circuit 58.

Figure 9:
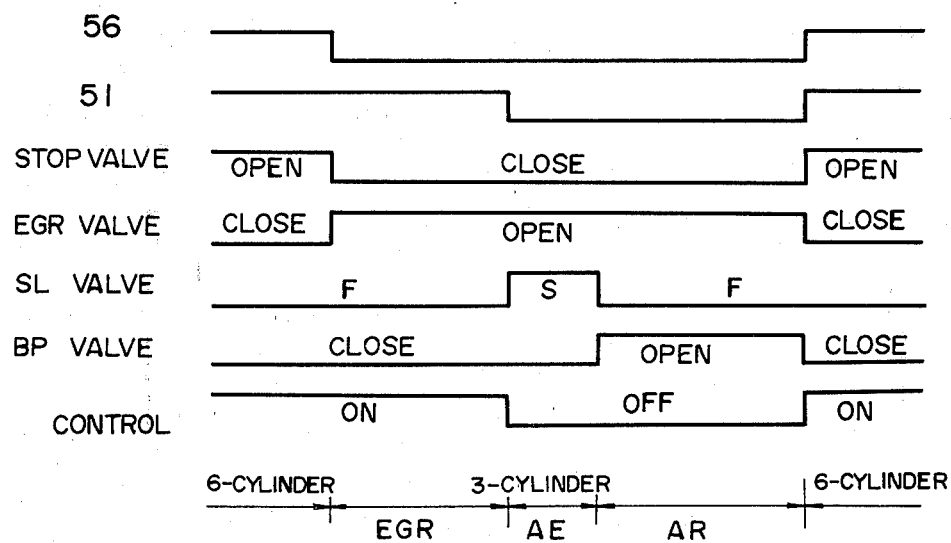
FIG. 9 is a time chart useful for explaining the operation of the electronic control system of FIG. 8.

Referring to FIG. 9, the operation of the electronic control system of FIG. 8 will be described in connection with the waveforms of the outputs of the load detector 56 and the very low load detector 51.

At high load conditions, both of the outputs of the load detector 56 and the very low load detector 51 are high as shown by the waveforms 56 and 51 of FIG. 9. Consequently, the stop valve drive circuit 40 opens the stop valve 5 and the EGR valve drive circuit 41 closes the EGR valve 10. In this state of the system, the output of the inverter 54 is low to cause the SL valve drive circuit 43 to operate the solenoid valve 26 so as to provide communication between its outlet and its first inlet. The exclusive-or gate 53 provides a high output to cause the BP valve drive circuit 42 to close the bypass valve 23. As a result, an air/fuel mixture is supplied from the carburetor 25 through the intake passage branches 2A and 2B into the active and inactive cylinder units 1A and 1B, respectively, with the second intake passage branch 2B being disconnected from the second exhaust passage branch 6B. The spark control circuit 59 is responsive to a high input from the load detector 56 to supply spark pulses to all of the spark plugs for the active and inactive cylinder units 1A and 1B. Accordingly, the engine is placed in a 6-cylinder mode of operation. The $\lambda$-control circuit 58 has a high input from the very low load detector 51 to allow $\lambda$-control.

If the engine load falls below a predetermined value but above a very low value, the output of the load detector 56 changes to its low level while the output of the very low load detector 51 remains high as shown by the waveforms 56 and 51 of FIG. 9. As result, the spark control circuit 59 has a low input from the load detector 56 to cut off the supply of spark pulses to the spark plugs for the inactive cylinder unit 1B. The stop valve drive circuit 40 closes the stop valve 5 so as to cut off the flow of the mixture to the inactive cylinder unit 1B and the EGR valve drive circuit 41 opens the EGR valve 10 so as to allow the recirculation of exhaust gases into the second intake passage branch 2B (since the solenoid valve 26 is held in the previous state to provide communication between its outlet and its first inlet). Consequently, the engine is placed in a 3-cylinder mode of operation with exhaust gases being recirculated into the second intake passage branch 2B. In this state of the system, the $\lambda$-control circuit 58 has a high input from the very low load detector 51 to continue $\lambda$-control.

When the engine load falls to the very low value, the output of the very low load detector 51 changes to its low level and the output of the load detector 56 is held low as shown by the waveforms 56 and 51 of FIG. 9. In this state of the system, the spark control circuit 59 interrupts the supply of spark pulses to the spark plugs of the inactive cylinder unit 1B, the stop valve 5 is held closed to cut off the flow of the mixture to the inactive cylinder unit 1B, and the EGR valve 10 is held open. The output of the inverter 54 changes to the high level only for a predetermined time T and thereafter returns to the low level. Accordingly, for the time T after the very low load condition occurs, the SL valve drive circuit 43 has a high input from the inverter 54 to cause the solenoid valve 26 to provide communication between its outlet and its second inlet so that a part of air in the intake passage 2 can be introduced through the EGR valve 10, which is open at this time, into the second intake passage branch 2B. In addition, the exclusive-or gate 53 changes to its high level to cause the BP valve drive circuit 42 to close the bypass valve 23. As a result, the engine is placed in a 3-cylinder mode of operation with air being introduced into the second intake passage branch 2B. In this state of the system, the $\lambda$-control circuit 58 has a low input from the very low load detector 51 to interrupt the $\lambda$-control.

After the predetermined time T lapses, the output of the load detector 56 is held low so as to maintain the stop valve 5 closed and the EGR valve 10 open, whereas the output of the inverter 54 changes from the high level to the low level. This causes the solenoid valve 26 to provide communication between its outlet and its first inlet so as to allow recirculation of air which had been introduced into the second intake passage branch 2B and discharged from the inactive cylinder unit 1B during the predetermined time T, through the EGR passage 9, the solenoid valve 26 and the EGR valve 10 into the second intake passage branch 2B. In addition, the output of the exclusive-or gate 53 changes to cause the BP valve drive circuit 42 to cause the bypass valve 23 to open so as to allow the flow of air through the bypass passage 29 into the second intake passage branch 2B to compensate for the amount of air consumed. In this state of the system, the $\lambda$-control circuit 58 has a low input from the very low load detector 51 and continues to interrupt $\lambda$-control.

If the engine load increases again above the predetermined value, the output of the load detector 56 changes to high level and the output of the very low load detector 51 changes to a high level as shown by the waveforms 56 and 51 of FIG. 9. Consequently, the stop valve drive circuit 40 has a high input from the load detector 56 to open the stop valve 5 so as to resume the supply of the mixture into the inactive cylinder unit 1B and the EGR valve drive circuit 41 has a high input therefrom to close the EGR valve 10. The spark control circuit 59 is responsive to the high output of the load detector 56 to resume the application of spark pulses to the spark plugs for the inactive cylinder unit 1B. In this state of the system, the output of the inverter 54 changes to a low level to cause the SL valve drive circuit 43 to operate the solenoid valve 26 so as to provide communication between its outlet and its first inlet. The output of the exclusive-or gate 53 changes to a high level to cause the BP valve drive circuit 42 to close the bypass valve 23. As a result, the engine is placed in a 6-cylinder mode of operation without gas recirculation. In addition, the λ-control circuit 58 is responsive to the high output of the very low load detector 51 to resume λ-control.

In view of more accurate air recirculation control, it is preferable to control the timing of operation of the valves in accordance with valve response speed, exhaust gas flow rate, and any other factors.

There has been provided, in accordance with the present invention, an improved split engine which can perform stable operation over the full range of engine load conditions. The possibility of unstable engine operation resulting from leakage of exhaust gases into the active cylinders during a split engine operation is eliminated by recirculating air into the inactive cylinders. Such air recirculation can minimize the amount of air flowing through the associated catalytic converter to cause a reduction of temperature thereof as compared to introduction of air into the inactive cylinders which has been done in conventional split engines. Although a part of the air discharged from the inactive cylinders would be mixed with the exhaust gases discharged from the active cylinders and flow over the catalytic converter, the amount of the air is too small to significantly reduce the temperature of the catalytic converter.

In addition, air is introduced through a check valve into the second intake passage branch to compensate for the amount of air escaping through the stop valve into the first intake passage branch. This prevents exhaust gases from mixing with the air recirculated into the second intake passage branch.

Furthermore, if the present invention is applied to a split engine using an oxygen sensor for controlling the fuel supplied to the engine so as to maintain an optimum air/fuel ratio, λ-control is interrupted at low load conditions to prevent inaccurate control from occurring due to the flow of air over the oxygen sensor. The time of interruption of λ-control can be reduced by interrupting λ-control only at very low load conditions.

While the present invention has been described in conjunction with specific embodiments thereof, it is evident that many alternatives, modifications and variations will be apparent to those skilled in the art. Accordingly, it is intended to embrace all alternatives, modifications and variations that fall within the spirit and broad scope of the appended claims.

What is claimed is:

1. An internal combustion engine comprising:
   (a) first and second cylinder units each including at least one cylinder;
   (b) an intake passage provided therein with a throttle valve and divided downstream of said throttle valve into first and second branches leading to said first and second cylinder units, respectively, said second intake passage branch having therein a first valve means which is normally open;
   (c) an exhaust passage divided into first and second branches leading from said first and second cylinder units, respectively;
   (d) a first passage having one end opening into said second exhaust passage branch and another end opening into said second intake passage branch, said first passage having therein a second valve means which is normally closed;
   (e) fuel supply means for supplying an optimum amount of fuel to said first and second cylinder units under varying conditions;
   (f) a load detector responsive to engine load for providing a low load indicative signal when the engine load is below a predetermined value;
   (g) means responsive to the low load indicative signal to inactivate said second cylinder unit;
   (h) delay means responsive to the low load indicative signal from said load detector for providing a drive signal a predetermined time after the arrival of the low load indicative signal thereto; and
   (i) first valve drive means responsive to the drive signal from said delay means for closing said first valve means and opening said second valve means.

2. An internal combustion engine according to claim 1, which further comprises an exhaust gas sensor located in said exhaust passage for providing an air/fuel ratio indicative signal, control means responsive to the output of said exhaust gas sensor for maintaining an optimum air/fuel ratio, and means responsive to the low load indicative signal from said load detector for interrupting the operation of said control means.

3. An internal combustion engine according to claim 1, which further comprises a second passage for introducing air into said second intake passage branch, said second passage having therein a third valve means which is normally closed, and a second valve drive means responsive to the drive signal from said delay means for opening said third valve means.

4. An internal combustion engine comprising:
   (a) first and second cylinder unit each including at least one cylinder;
   (b) an intake passage provided therein with a throttle valve and divided downstream of said throttle valve into first and second branches leading to said first and second cylinder units, respectively, said second intake passage branch having therein a first valve means which is normally open;
   (c) an exhaust passage divided into first and second branches leading from said first and second cylinder units, respectively;
   (d) a first passage having one end opening into said second exhaust passage branch and another end opening into said second intake passage branch, said first passage having therein a second valve means which is normally closed;
   (e) fuel supply means for supplying an optimum amount of fuel to said first and second cylinder units under varying conditions;
   (f) a first load detector responsive to engine load for providing a low load indicative signal when the engine load is below a first predetermined value;
   (g) means responsive to the low load indicative signal from said first load detector for cutting off the supply of fuel to said second cylinder unit;
   (h) a second load detector responsive to engine load for providing a very low load indicative signal when the engine load is below a second predetermined value lower than the first predetermined value;
   (i) a drive signal generator responsive to the low load indicative signal from said first load detector for providing a drive signal and responsive to the very low load indicative signal from said second load detector for interrupting the generation of the drive signal for a predetermined time; and
   (j) first valve drive means responsive to the drive signal from said drive signal generator for closing said first valve means and opening said second valve means.

5. An internal combustion engine according to claim 4, which further comprises an exhaust gas sensor located in said exhaust passage for providing an air/fuel ratio indicative signal, control means responsive to the output of said exhaust gas sensor for maintaining an optimum air/fuel ratio, and means responsive to the very low load indicative signal from said second load detector for interrupting the operation of said control means.

6. An internal combustion engine according to claim 4, which further comprises a second passage for introducing air into said second intake passage branch, said second passage having therein third valve means normally closed, a delay means, responsive to the very low load indicative signal from said second load detector for providing a drive signal at a predetermined time after the arrival of the very low load indicative signal thereat, and second valve drive means responsive to the drive signal from said delay means for opening said third valve means.

7. An internal combustion engine comprising:
   (a) first and second cylinder units each including at least one cylinder provided with a spark plug;
   (b) an intake passage divided into first and second branches leading to said first and second cylinder units, respectively, said second intake passage branch having therein a first valve means which is normally open;
   (c) a carburetor for supplying a proper air-fuel mixture through said intake passage into said first and second cylinder units;
   (d) an exhaust passage divided into first and second branches leading from said first and second cylinder units, respectively;
   (e) a first passage having one end opening into said second exhaust passage branch and another end opening into said second intake passage branch, said first passage having therein a second valve means which is normally closed;
   (f) a load detector responsive to engine load for providing a low load indicative signal when the engine load is below a predetermined value;
   (g) means responsive to the low load indicative signal from said load detector to interrupt spark pulses to the spark plug of said second cylinder unit;
   (h) delay means responsive to the low load indicative signal from said load detector for providing a drive signal at a predetermined time after the arrival of the low load indicative signal thereat; and
   (i) first valve drive means responsive to the drive signal from said delay means for closing said first valve means and opening said second valve means.

8. An internal combustion engine according to claim 7, which further comprises an exhaust gas sensor located in said exhaust passage for providing an air/fuel ratio indicative signal, control means responsive to the output of said exhaust gas sensor for maintaining an optimum air/fuel ratio, and means responsive to the low load indicative signal from said load detector for interrupting the operation of said control means.

9. An internal combustion engine according to claim 7, which further comprises a second passage for introducing air into said second intake passage branch, said second passage having therein a third valve means which is normally closed, and second valve drive means responsive to the drive signal from said delay means for opening said third valve means.

10. An internal combustion engine comprising:
    (a) first and second cylinder units each including at least one cylinder provided with a spark plug;
    (b) an intake passage divided into first and second branches leading to said first and second cylinder units, respectively, said second intake passage branch having therein a first valve means which is normally open;
    (c) a carburetor for supplying a proper air-fuel mixture through said intake passage into said first and second cylinder units;
    (d) an exhaust passage divided into first and second branches leading from said first and second cylinder units, respectively;
    (e) a first passage having one end opening into said second exhaust passage branch;
    (f) a second passage for introducing air;
    (g) a third passage having one end opening into said second intake passage branch and having therein a second valve means;
    (h) a three-way solenoid valve having a first inlet connected to another end of said first passage, a second inlet connected to said second passage, and an outlet connected to another end of said third passage, said solenoid valve normally providing communication between its outlet and its first inlet;
    (i) a first load detector responsive to engine load for providing a low load indicative signal when the engine load is below a predetermined value;
    (j) means responsive to the low load indicative signal from said first load detector to interrupt spark pulses to the spark plug of said second cylinder unit;
    (k) a second load detector responsive to engine load for providing a very low load indicative signal when the engine load is below a second predetermined value lower than the first predetermined value;
    (l) a drive signal generator responsive to the very low load indicative signal from said second load detector for providing a drive signal for a predetermined period of time;
    (m) first valve drive means responsive to the low load indicative signal form said first load detector for closing said first valve means and opening said second valve means; and
    (n) second valve drive means responsive to the drive signal from said drive signal generator for operating said solenoid valve to provide communication between its outlet and its second inlet.

11. An internal combustion engine according to claim 10, which further comprises an exhaust gas sensor located in said exhaust passage for providing an air/fuel ratio indicative signal, control means responsive to the output of said exhaust gas sensor for maintaining an optimum air/fuel ratio, and means responsive to the very low load indicative signal from said second load detector for interrupting the operation of said control means.

12. An internal combustion engine according to claim 10, which further comprises a fourth passage for introducing air into said second intake passage branch, said fourth passage having therein a third valve means which is normally closed, delay means responsive to the very low load indicative signal from said second load detector for providing a drive signal at a predetermined time after the arrival of the very low load indicative signal thereat, and third valve drive means responsive to the drive signal from said delay means for opening said third valve means.

13. An internal combustion engine comprising:

(a) first and second cylinder units each including at least one cylinder;
(b) an intake passage having disposed therein a throttle valve and being divided downstream of said throttle valve into first and second branches communicating with said first and second cylinder units, respectively, said intake passage second branch having an intake entrance;
(c) a first valve positioned generally in the vicinity of said intake entrance of said intake passage second branch;
(d) an exhaust passage divided into first and second branches communicating with said first and second cylinder units, respectively;
(e) a recirculation passage connecting said exhaust passage second branch to said intake passage second branch;
(f) a second valve positioned in said recirculation passage;
(g) an air passage connecting said intake passage second branch to the atmosphere;
(h) a third valve positioned in said air passage;
(i) means responsive to engine load conditions for disabling said second cylinder unit to shift engine operation into a split mode when the engine load is below a first predetermined value; and
(j) a control circuit for opening said first valve and closing said second and third valves when the engine load is above the first predetermined value, said control circuit controlling said first, second and third valves to introduce air into said second cylinder unit for a predetermined time and to recirculate the air into said second cylinder unit thorugh said recirculation passage during split mode engine operation.

14. The internal combustion engine of claim 13, wherein said engine load responsive means is operable to generate a low load indicative signal when the engine load is below the first predetermined value.

15. The internal combustion engine of claim 14, wherein said control circuit is operable to close said first valve and open said second and third valves at a predetermined time after the generation of the low load indicative signal.

16. The internal combustion engine of claim 15, wherein said control circuit comprises a delay circuit responsive to the low load indicative signal for generating a control signal at the predetermined time after the generation of the low load indicative signal, and drive circuits responsive to the control signal for closing said first valve and opening said second and third valves.

17. The internal combustion engine of claim 15, which further comprises an exhaust gas sensor located in said exhaust passage for generating an air/fuel ratio indicative signal, control means responsive to the output of said exhaust gas sensor for maintaining an optimum air/fuel ratio, and means responsive to the low load indicative signal for interrupting operation of said control means.

18. The internal combustion engine of claim 14, wherein said control circuit comprises a sensor for generating a very low load indicative signal when the engine load is below a second predetermined value lower than the first predetermined value, said control circuit being responsive to the low load indicative signal for closing said first valve and opening said second valve, said control circuit being responsive to the very low load indicative signal for opening said first valve and closing said second valve during the predetermined time.

19. The internal combustion engine of claim 18, wherein said control means is operable to open said third valve at the predetermined time after the generation of the very low load indicative signal.

20. The internal combustion engine of claim 18, wherein said sensor generates the very low load indicative signal when said throttle valve is closed.

21. The internal combustion engine of claim 18, which further comprises an exhaust gas sensor located in said exhaust passage generating an air/fuel ratio indicative signal, control means responsive to the output of said exhaust gas sensor for maintaining an optimum air/fuel ratio, and means responsive to very low load indicative signal for interrupting the operation of said control means.

22. The internal combustion engine of claim 14, which further includes a second air passage opening at its one end into the atmosphere and at the other end into said recirculation passage upstream of said second valve, and a solenoid valve movable between first and second positions, said solenoid valve dividing said recirculation passage into an upstream portion and a downstream portion having therein said second valve and communicating said second air passage with said recirculation passage downstream portion when in its first position, said solenoid valve connecting said recirculation passage upstream and downstream portions and disconnecting said second air passage from said recirculation passage downstream portion when in said second position.

23. The internal combustion engine of claim 22, wherein said control circuit comprises a sensor for generating a very low load indicative signal when the engine load is below a second predetermined value lower than the first predetermined value, said control circuit being responsive to the low load indicative signal for closing said first valve and closing said second valve, said control circuit being responsive to the very low load indicative signal for moving said solenoid valve to its first position during the predetermined time.

24. The internal combustion engine of claim 23, wherein said control means opens said third valve at the predetermined time after the generation of the very low load indicative signal.

25. The internal combustion engine of claim 22, wherein said sensor generates the very low load signal when said throttle valve is closed.

26. The internal combustion engine of claim 23, further comprising an exhaust gas sensor located in said exhaust passage for providing an air/fuel ratio indicative signal, control means responsive to the output of said exhaust gas sensor for maintaining an optimum air/fuel ratio, and means responsive to the very low load indicative signal for interrupting the operation of said control means.

* * * * *